(12) United States Patent
Harada et al.

(10) Patent No.: US 12,206,456 B2
(45) Date of Patent: Jan. 21, 2025

(54) WAVELENGTH MULTIPLEXING COMMUNICATION SYSTEM AND WAVELENGTH MULTIPLEXING COMMUNICATION METHOD

(71) Applicant: NIPPON TELEGRAPH AND TELEPHONE CORPORATION, Tokyo (JP)

(72) Inventors: Rintaro Harada, Musashino (JP); Hirotaka Ujikawa, Musashino (JP); Shin Kaneko, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/908,457

(22) PCT Filed: Mar. 2, 2020

(86) PCT No.: PCT/JP2020/008618
§ 371 (c)(1),
(2) Date: Aug. 31, 2022

(87) PCT Pub. No.: WO2021/176496
PCT Pub. Date: Sep. 10, 2021

(65) Prior Publication Data
US 2023/0094895 A1 Mar. 30, 2023

(51) Int. Cl.
*H04B 10/272* (2013.01)
*H04B 10/40* (2013.01)
(Continued)

(52) U.S. Cl.
CPC ............ *H04B 10/272* (2013.01); *H04J 14/02* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 6,404,535 B1 * | 6/2002 | Leight ............... G06E 3/005 |
| | | 708/422 |
| 2006/0140631 A1 * | 6/2006 | Brolin ............... H04J 14/025 |
| | | 398/79 |

(Continued)

FOREIGN PATENT DOCUMENTS

WO WO-2018062281 A1 4/2018

OTHER PUBLICATIONS 5G wireless fronthaul requirements in a passive optical network context, International Telecommunication Union, ITU-T G-series Recommendations Supplement 66, Oct. 19, 2018.

*Primary Examiner* — Darren E Wolf

(57) ABSTRACT

A wavelength multiplexing communication system includes a master station apparatus and a plurality of slave station apparatuses. The master station apparatus includes a wavelength multiplexing communication unit. The wavelength multiplexing communication unit performs wavelength multiplexing communication with the plurality of slave station apparatuses by using optical signals having the number of wavelengths equal to or less than the number of the plurality of slave station apparatuses. The slave station apparatus includes an optical communication unit. When the main signal communication is performed in the host slave station apparatus, the optical communication unit communicates with the master station apparatus by an optical signal having the same wavelength as a wavelength used by another slave station apparatus in which a main signal notification is not performed.

6 Claims, 7 Drawing Sheets

(51) Int. Cl.
*H04B 10/50* (2013.01)
*H04B 10/60* (2013.01)
*H04J 14/02* (2006.01)

(56) References Cited

U.S. PATENT DOCUMENTS

| | | | |
|---|---|---|---|
| 2008/0013950 A1* | 1/2008 | Boudreault | H04J 14/0216 398/59 |
| 2009/0245805 A1* | 10/2009 | Akasaka | H04B 10/1125 398/128 |
| 2011/0033187 A1* | 2/2011 | Rossetti | H04J 14/0247 398/79 |
| 2013/0004174 A1* | 1/2013 | Lee | H04B 10/272 398/79 |
| 2019/0372698 A1 | 12/2019 | Hisano et al. | |

* cited by examiner

# WAVELENGTH MULTIPLEXING COMMUNICATION SYSTEM AND WAVELENGTH MULTIPLEXING COMMUNICATION METHOD

CROSS-REFERENCE TO RELATED APPLICATIONS

This application is a 371 U.S. National Phase of International Application No. PCT/JP2020/008618, filed on Mar. 2, 2020. The entire disclosure of the above application is incorporated herein by reference.

TECHNICAL FIELD

The present invention relates to a wavelength multiplexing communication system and a wavelength multiplexing communication method.

BACKGROUND ART

Functions of a base station in a mobile system are divided into a central unit (CU), a distributed unit (DU), and a remote unit (RU). The RU is responsible for lower layer portions of base station functions. This function of the RU is a radio communication (RF) function with a portion of a physical layer (PHY). The RU performs radio communication with a user equipment (UE).

FIG. 6 is a diagram illustrating a configuration in which a wavelength division multiplex-passive optical network (WDM-PON) system is applied to a mobile fronthaul (MFH). A mobile system includes a CU, N pieces of DUs, and N pieces of RUs. N pieces of DUs are described as DU #1 to DU #N, and N pieces of RUs are described as RU #1 to RU #N. The DU #m (m is an integer of 1 or greater and N or less) and RU #m are logically connected on point-to-point basis. The WDM-PON relays a main signal received by the RU #m from the UE by radio communication to the DU #m. The WDM-PON relays a main signal addressed to the UE performing radio communication with the RU #m from the DU #m to the RU #m. As illustrated in FIG. 6, the WDM-PON includes an optical line terminal (OLT) with N pieces of optical line terminal-channel terminals (OLT-CTs), and N pieces of optical network units (ONUs), and is composed of N pairs of OLT-CT and ONU. By applying such a WDM-PON configuration, the number of optical fibers of the MFH can be reduced. An OLT-CT #m that is the m-th OLT-CT and an ONU #m that is the m-th ONU transmit and receive optical signals using the wavelength $\lambda_{U\text{-}m}$ on the uplink and using the wavelength $\lambda_{D\text{-}m}$ on the downlink.

FIG. 7 is an example of a train C that travels at high speed over a track R. It is contemplated that multiple RUs are installed along the track R to provide high-speed radio communication to UEs provided on the train C or present in the train C. However, because the train C travels along the track, the main signal communication is performed only in some RUs at a certain time. For example, in FIG. 7, among the RU #1 to RU #N installed along the track, communication is performed only in the RU #2 and RU #3 that can communicate with the UE from the current position of the train C, and communication is not performed in the other RUs.

CITATION LIST

Non Patent Literature

NPL 1: "5G wireless fronthaul requirements in a passive optical network context", International Telecommunication Union, ITU-T G. Supplement 66, FIG. 9-4, p. 21, October 2018

SUMMARY OF THE INVENTION

Technical Problem

In order to achieve high-speed radio communication, it is effective to use a high frequency band capable of securing a wide frequency bandwidth. On the other hand, in the case of using the high frequency band, since the radio coverage per RU becomes small, the number of RUs required for converting a certain area into a radio area increases. When the number of RUs increases, the number of required wavelengths, the number of required OLT-CTs, and the number of required ONUs also increase, which increases equipment investment costs. As illustrated in FIG. 7, in a use case of a moving body where main signal communication is performed only in some RUs, the actual traffic amount is smaller than the system band, and thus the utilization efficiency of the system band is low.

In view of the above circumstances, an object of the present invention is to provide a wavelength multiplexing communication system and a wavelength multiplexing communication method capable of reducing costs of optical communication and improving utilization efficiency of a band.

Means for Solving the Problem

According to one aspect of the present invention, a wavelength multiplexing communication system comprises: a master station apparatus; and a plurality of slave station apparatuses. The master station apparatus includes a wavelength multiplexing communication unit configured to perform wavelength multiplexing communication with the plurality of slave station apparatuses by using optical signal having the number of wavelengths equal to or less than the number of the plurality of slave station apparatuses, and a slave station apparatus of the plurality of slave station apparatuses includes an optical communication unit configured to, when main signal communication is performed in the slave station apparatus, communicate with the master station apparatus by using an optical signal having the same wavelength as a wavelength used by another slave station apparatus of the plurality of slave station apparatuses in which a main signal notification is not performed.

According to one aspect of the present invention, a wavelength multiplexing communication method in a wavelength multiplexing communication system including a master station apparatus and a plurality of slave station apparatuses comprises: performing, by the master station apparatus, wavelength multiplexing communication with the plurality of slave station apparatuses by using optical signals having the number of wavelengths equal to or less than the number of the plurality of slave station apparatuses; and performing, by a slave station apparatus of the plurality of slave station apparatuses, when main signal communication is performed in the slave station apparatus, communication with the master station apparatus by using an optical signal having the same wavelength as a wavelength used by another slave station apparatus of the plurality of slave station apparatuses in which a main signal notification is not performed.

Effects of the Invention

According to the present invention, it is possible to reduce costs of optical communication and improve utilization efficiency of a band.

DESCRIPTION OF EMBODIMENTS

Hereinafter, embodiments of the present invention will be described in detail with reference to the drawings.

First Embodiment

Figure 1:
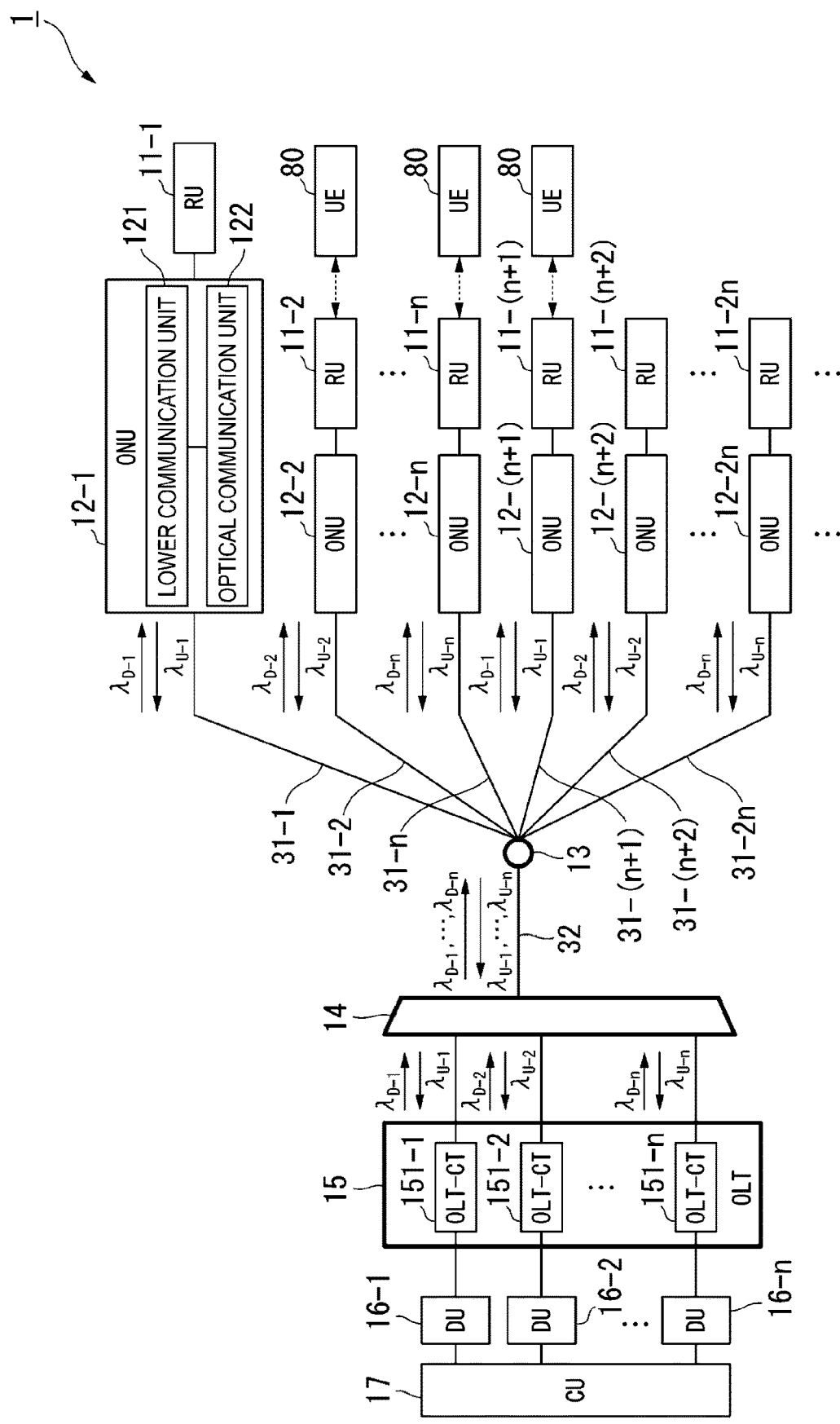
FIG. 1 is a diagram illustrating an exemplary configuration of a wavelength multiplexing communication system according to a first embodiment of the present invention.

FIG. 1 is a diagram illustrating an exemplary configuration of a wavelength multiplexing communication system 1 according to a first embodiment of the present invention. The wavelength multiplexing communication system 1 relays a main signal generated in a mobile system by an optical access system. In the present embodiment, a wavelength division multiplex-passive optical network (WDM-PON) is used as the optical access system. The wavelength multiplexing communication system 1 includes N (N is an integer of 1 or greater) remote units (RUs) 11, N optical network units (ONUs) 12, an optical multiplexing/demultiplexing unit 13, a wavelength multiplexing/demultiplexing unit 14, an optical line terminal (OLT) 15, n (n is an integer of 1 or greater and N or less) distributed units (DUs) 16, and a central unit (CU) 17. The N RUs 11, n DUs 16, and the CU 17 constitute a mobile system. The RU 11 performs radio communication with the user equipment (UE) 80. The N ONUs 12, the optical coupling/splitting unit 13, the wavelength multiplexing/demultiplexing unit 14, and the OLT 15 constitute the optical access system. Each of the ONUs 12 and the optical coupling/splitting unit 13 are connected by a transmission line 31. The optical coupling/splitting unit 13 and the wavelength multiplexing/demultiplexing unit 14 are connected by a transmission line 32. The transmission line 31 and the transmission line 32 are each, for example, an optical fiber.

Then described above is the maximum number of RUs 11 that perform radio communication with the UE 80 at the same time. In the RU 11, main signal communication is performed by radio communication with the UE 80. Since the RU 11 and the ONU 12 are connected on a one-to-one basis, n is also the maximum number of ONUs 12 that can simultaneously perform main signal communication. In the present embodiment, the N RUs 11 are referred to as RU 11-1 to RU 11-N, the N ONUs 12 are referred to as ONU 12-1 to ONU 12-N, and then DUs 16 are referred to as DU 16-1 to DU 16-n. The RU 11-j (j is an integer of 1 or greater and N or less) is connected to the ONU 12-j. The transmission line 31 between the ONU 12-j and the optical coupling/splitting unit 13 is described as a transmission line 31-j. A direction from the RU 11 to the CU 17 is uplink, and a direction from the CU 17 to the RU 11 is downlink.

When the n RUs 11 perform radio communication with the UE 80, the ONUs 12-1 to 12-N and the OLT 15 of the present embodiment use the wavelengths $\lambda_{U-1}$ to $\lambda_{U-n}$ for the uplink communication and the wavelengths $\lambda_{D-1}$ to $\lambda_{D-n}$ for the downlink communication. Hereinafter, the set of the wavelength $\lambda_{U-i}$ and the wavelength $\lambda_{D-i}$ is referred to as a wavelength $\lambda_i$ (i is an integer of 1 or greater and n or less). The wavelengths $\lambda_1$ to $\lambda_n$ are assigned to the maximum number n of ONUs 12 in which main signal communication is performed in the same period such that the ONUs 12 each have different wavelength from that of others. A wavelength assigned to a certain ONU 12 is always the same. For example, it is assumed that the RUs 11-1 to 11-N are sequentially installed along a route along which a moving body in which n UEs 80 are provided travels. In this case, depending on the time, the combination of the RU in which the main signal occurs changes. In any of the combinations that change with this time, wavelengths $\lambda_1$ to $\lambda_n$ are periodically assigned in order from the ONU 12-1 such that the wavelengths used for the RU 11 in which the main signal is generated are different from each other. That is, when j is not a multiple of n, a wavelength $\lambda_{(j \ mod(n))}$ is assigned to the ONU 12-j, and when j is a multiple of n, a wavelength $\lambda_n$ is assigned to the ONU 12-j. Then, mod is a modulo operation. Even when the number of ONUs 12 in which the main signal communication is performed in the same period is less than n, the ONU 12 in which the main signal communication is performed performs communication by using a wavelength that is fixed and assigned in advance.

The RU 11 performs radio communication with the UE 80 existing in a subordinate cell. There are cases where a single radio communication cell is configured by all RUs 11 and when each RU 11 configures one radio communication cell. The RU 11-j outputs a control signal of the radio system and an uplink main signal received by radio communication from the UE 80 to the ONU 12-j. The RU 11-j receives the control signal of the radio system and the main signal from the ONU 12-j, and transmits the received main signal to the UE 80 by radio communication. The RU-11 j is logically connected by point-to-point connection to the DU-16-(j mod(n)) when j is not a multiple of n, and to the DU 16-n when j is a multiple of n.

The ONU 12 includes a lower communication unit 121 and an optical communication unit 122. The lower communication unit 121 of the ONU 12-j receives the control signal for the upstream radio system and the upstream main signal from the RU 11-j, and outputs them to the optical communication unit 122. The lower communication unit 121 of the ONU 12-j outputs the downstream control signal of the radio system and the downstream main signal output by the optical communication unit 122 to the RU 11-j.

The optical communication unit 122 transmits and receives optical signals to and from the OLT 15. When j is not a multiple of n, the optical communication unit 122 of the ONU 12-$j$ converts the uplink signal from the electrical signal into an optical signal of a wavelength $\lambda_{U\text{-}(j\ mod(n))}$ and outputs the optical signal to the transmission line 31-$j$. When j is a multiple of n, the optical communication unit 122 of the ONU 12-$j$ converts the uplink signal from the electrical signal into an optical signal of a wavelength $\lambda_{U\text{-}n}$ and outputs the optical signal to the transmission line 31-$j$. The uplink signal includes the control signal of the optical access system, the uplink control signal and the main signal of the radio system received by the lower communication unit 121. When j is not a multiple of n, the optical communication unit 122 of the ONU 12-$j$ receives a downlink signal of a wavelength $\lambda_{D\text{-}(j\ mod(n))}$ among downlink wavelength-multiplexed signals transmitted through the transmission line 31-$j$ and converts the downlink signal into an electrical signal. When j is a multiple of n, the optical communication unit 122 of the ONU 12-$j$ receives a downlink signal of a wavelength $\lambda_{D\text{-}n}$ among downlink wavelength-multiplexed signals transmitted through the transmission line 31-$j$ and converts the downlink signal into an electrical signal. The downlink signal includes a downlink control signal of the optical access system, and the downlink control signal and the downlink main signal of the radio system.

The optical coupling/splitting unit 13 is, for example, a power splitter. The optical multiplexing/demultiplexing unit 13 receives the uplink optical signal of the wavelength $\lambda_{U\text{-}1}$ to $\lambda_{U\text{-}n}$ from the transmission line 31-1 to 31-N, and outputs a wavelength multiplexed signal obtained by multiplexing the received uplink optical signal to the transmission line 32. The optical multiplexing/demultiplexing unit 13 receives the wavelength multiplexed signal in which the downlink optical signals of the wavelengths $\lambda_{D\text{-}1}$ to $\lambda_{D\text{-}n}$ are multiplexed from the transmission line 32, and demultiplexes the received wavelength multiplexed signal to output the result to the transmission lines 31-1 to 31-N.

The wavelength multiplexing/demultiplexing unit 14 is, for example, arrayed waveguide gratings (AWG). The wavelength multiplexing/demultiplexing unit 14 demultiplexes the uplink wavelength multiplexed signal transmitted through the transmission line 32 into the uplink optical signal of the wavelength $\lambda_{U\text{-}1}$ to $\lambda_{U\text{-}n}$ and outputs the uplink optical signal to the OLT 15. The wavelength multiplexing/demultiplexing unit 14 multiplexes the downlink optical signals having the wavelengths $\lambda_{D\text{-}1}$ to $\lambda_{D\text{-}n}$ output from the OLT 15, and outputs the multiplexed optical signals to the transmission line 32 as wavelength multiplexed signals.

The OLT 15 includes n OLT-CTs 151. The OLT-CT 151 terminates the channel of the optical signal. The n OLT-CTs 151 are referred to as OLT-CTs 151-1 to 151-$n$. The OLT-CT 151-$i$ (i is an integer of 1 or greater and n or less) receives an uplink optical signal of a wavelength $\lambda_{U\text{-}i}$ converts the received uplink optical signal into a signal frame of an electrical signal, and outputs the signal frame to the DU 16-$i$. The OLT-CT 151-$i$ converts the signal frame of the downlink electrical signal received from the DU 16-$i$ into an optical signal and outputs the optical signal to the wavelength multiplexing/demultiplexing unit 14.

The DU 16-$i$ outputs the uplink main signal received from the OLT-CT 151-$i$ to the CU 17, and outputs the downlink main signal input from the CU 17 to OLT-CT 151-$i$. The CU 17 outputs uplink main signals input from the DUs 16-1 to 16-$n$ to a higher-level apparatus (not illustrated), and outputs downlink main signals received from the higher-level apparatus (not illustrated) to the DUs 16-1 to 16-$n$. The output destination of the downlink main signal is the DU 16 that is logically connected to the RU 11 of the destination of the main signal.

Figure 2:
FIG. 2 is a diagram illustrating a use case of a moving body of the wavelength multiplexing communication system according to the first embodiment.

FIG. 2 is a diagram illustrating a use case of a moving body of the wavelength multiplexing communication system 1. The right column of FIG. 2 illustrates the RU 11 communicating with the UE 80 at each time and the wavelength used by the ONU 12. The left column of FIG. 2 illustrates signals transmitted and received in the optical access section between each ONU 12 and the OLT 15 at each time. Here, t indicates time.

The UE 80 is provided in a train C moving at a high speed on a track R. Along the track R, RUs 11-1 to 11-N are installed. FIG. 2 illustrates RUs up to the RU 11-4. In FIG. 2, there are two UEs 80 provided in the train C, and up to two RUs 11 (n=2) perform radio communication in the same period. A wavelength $\lambda_1$ is assigned to the ONUs 12-1, 12-3 and the wavelength $\lambda_2$ is assigned to the ONUs 12-2, 12-4.

At time T1, each of the RUs 11-1 and 11-2 performs radio communication with the corresponding UE 80. First, the uplink communication at time T1 will be described. The RU 11-1 outputs an uplink main signal received by radio communication from the UE 80 to the ONU 12-1, and the RU 11-2 outputs an uplink main signal received by radio communication from the UE 80 to the ONU 12-2. Each RU 11-$j$ outputs a control signal of the radio system to the ONU 12-$j$.

The optical communication unit 122 of the ONU 12-1 outputs an optical signal of a wavelength $\lambda_{U\text{-}1}$ including the uplink control signal of the optical access system and the uplink control signal and the main signal of the radio system received by the lower communication unit 121 from the RU 11-1 to the transmission line 31-1. The optical communication unit 122 of the ONU 12-2 outputs an optical signal of a wavelength $\lambda_{U\text{-}2}$ including the uplink control signal of the optical access system and the uplink control signal and the main signal of the radio system received by the lower communication unit 121 from the RU 11-2 to the transmission line 31-2. The optical communication unit 122 of the ONU 12-$j$ excluding ONUs 12-1 and 12-2 outputs an optical signal of a wavelength $\lambda_{U\text{-}(j\ mod(n))}$ (however, when j is a multiple of n, a wavelength $\lambda_{U\text{-}n}$) including the uplink control signal of the optical access system, and the uplink control signal of the radio system received by the lower communication unit 121 from the RU 11-$j$ to the transmission line 31-$j$.

The optical multiplexing/demultiplexing unit 13 outputs a wavelength multiplexed signal obtained by multiplexing the uplink optical signal of the wavelength $\lambda_{U\text{-}1}$ to $\lambda_{U\text{-}2}$ to the transmission line 32. The wavelength multiplexing/demultiplexing unit 14 demultiplexes the uplink wavelength multiplexed signal transmitted through the transmission line 32 into the uplink optical signal of the wavelength $\lambda_{U\text{-}1}$ to $\lambda_{U\text{-}2}$. The wavelength multiplexing/demultiplexing unit 14 outputs the optical signal having a wavelength $\lambda_{U\text{-}i}$ to the OLT-CT 151-$i$. n=2, and therefore, i=1, 2. The OLT-CT 151-$i$ converts the input optical signal into a signal frame of an electrical signal and outputs the signal frame to the DU 16-$i$, and the DU 16-$i$ outputs the uplink signal frame received from the OLT-CT 151-$i$ to the CU 17. The CU 17 outputs the uplink main signal input from each of the DU 16-1 and the DU 16-2 to a higher apparatus (not illustrated).

Next, downlink communication at the time T1 will be described. The CU 17 receives the downlink main signal destined for the RU 11-1 and the downlink downlink main signal destined for the RU 11-2 from a higher apparatus (not illustrated). The CU 17 outputs a downlink main signal destined for the RU 11-1 to the DU 16-1, and outputs a downlink main signal addressed to the RU 11-2 to the DU 16-2. The DU 16-*i* outputs a signal frame of a down link control signal and a signal frame of a downlink main signal of the radio system to the OLT-CT 151-*i*. The OLT-CT 151-*i* converts the downlink control signal frame and the downlink main signal of the radio system, and the downlink control signal of the optical access system into an optical signal of a wavelength $\lambda_{D-i}$, and outputs the optical signal to the wavelength multiplexing/demultiplexing unit 14.

The wavelength multiplexing/demultiplexing unit 14 outputs a wavelength multiplexed signal obtained by multiplexing the downlink optical signal of each of the wavelengths $\lambda_{D-1}$ and $\lambda_{D-2}$ output by the OLT 15, to the transmission line 32. The optical coupling/splitting unit 13 receives the wavelength-multiplexed signal from the transmission line 32, splits the received wavelength-multiplexed signal, and outputs the result to the corresponding transmission line among the transmission lines 31-1 to 31-N.

The optical communication unit 122 of the ONU 12-*j* inputs a downlink wavelength multiplexed signal from the transmission line 31-*j*. The optical communication unit 122 of the ONU 12-*j* selects and receives an optical signal of a wavelength $\lambda_{D-(j \, mod(n))}$ (however, j is a multiple of n, wavelength $\lambda_{D-n}$) from the input wavelength multiplexed signal, and converts the optical signal into an electrical signal. The lower communication unit 121 of each ONU 12-*j* outputs the control signal of the radio system that has been converted into an electrical signal to the RU 11-*i*. The lower communication unit 121 of the ONU 12-1 outputs the main signal that has been converted into an electrical signal to the RU 11-1, and the lower communication unit 121 of the ONU 12-2 outputs the main signal that has been converted into an electrical signal to the RU 11-2. The RU 11-1 transmits by radio communication the main signal received from the ONU 12-1 to the UE 80, and the RU 11-2 transmits by radio communication the main signal received from the ONU 12-2 to the UE 80.

The train C travels and, at time T2, each of the RUs 11-2 and 11-3 performs radio communication with the corresponding UE 80. The uplink communication at the time T2 will be described. The RU 11-2 outputs an uplink main signal received by radio communication from the UE 80 to the ONU 12-2, and the RU 11-3 outputs an uplink main signal received by radio communication from the UE 80 to the ONU 12-3. Each RU 11-*j* outputs a control signal of the radio system to the ONU 12-*j*.

The optical communication unit 122 of the ONU 12-2 outputs an optical signal of a wavelength $\lambda_{U-2}$ including the uplink control signal of the optical access system and the uplink control signal and the main signal of the radio system received by the lower communication unit 121 from the RU 11-2 to the transmission line 31-1. The optical communication unit 122 of the ONU 12-3 outputs an optical signal of a wavelength $\lambda_{U-1}$ including the uplink control signal of the optical access system and the uplink control signal and the main signal of the radio system received by the lower communication unit 121 from the RU 11-3 to the transmission line 31-3. The optical communication unit 122 of the ONU 12-*j* excluding ONUs 12-2 and 12-3 outputs an optical signal of a wavelength $\lambda_{U-(j \, mod(n))}$ (however, when j is a multiple of n, a wavelength $\lambda_{U-n}$) including the uplink control signal of the optical access system, and the uplink control signal of the radio system received by the lower communication unit 121 from the RU 11-*j* to the transmission line 31-*j*. The subsequent processing is similar to that in the case of the time T1.

The downlink communication at the time T2 will be described. The CU 17 receives the downlink main signal destined for the RU 11-2 and the downlink downlink main signal destined for the RU 11-3 from a higher apparatus (not illustrated). The CU 17 outputs a downlink main signal destined for the RU 11-2 to the DU 16-2, and outputs a downlink main signal addressed to the RU 11-3 to the DU 16-1. The following operation is similar to the operation of the downlink communication at the time T1 until the optical communication unit 122 of the ONU 12-*j* selects and receives a downlink wavelength multiplexed signal of a wavelength $\lambda_{D-(j \, mod(n))}$ (however, j is a multiple of n, a wavelength $\lambda_{D-n}$), and converts the wavelength multiplexed signal into an electrical signal. The lower communication unit 121 of each ONU 12-*j* outputs the control signal of the radio system that has been converted into an electrical signal to the RU 11-*j*. The lower communication unit 121 of the ONU 12-2 outputs the main signal that has been converted into an electrical signal to the RU 11-2, and the lower communication unit 121 of the ONU 12-3 outputs the main signal that has been converted into an electrical signal to the RU 11-3. The RU 11-2 transmits by radio communication the main signal received from the ONU 12-2 to the UE 80, and the RU 11-3 transmits by radio communication the main signal received from the ONU 12-3 to the UE 80.

Figure 3:
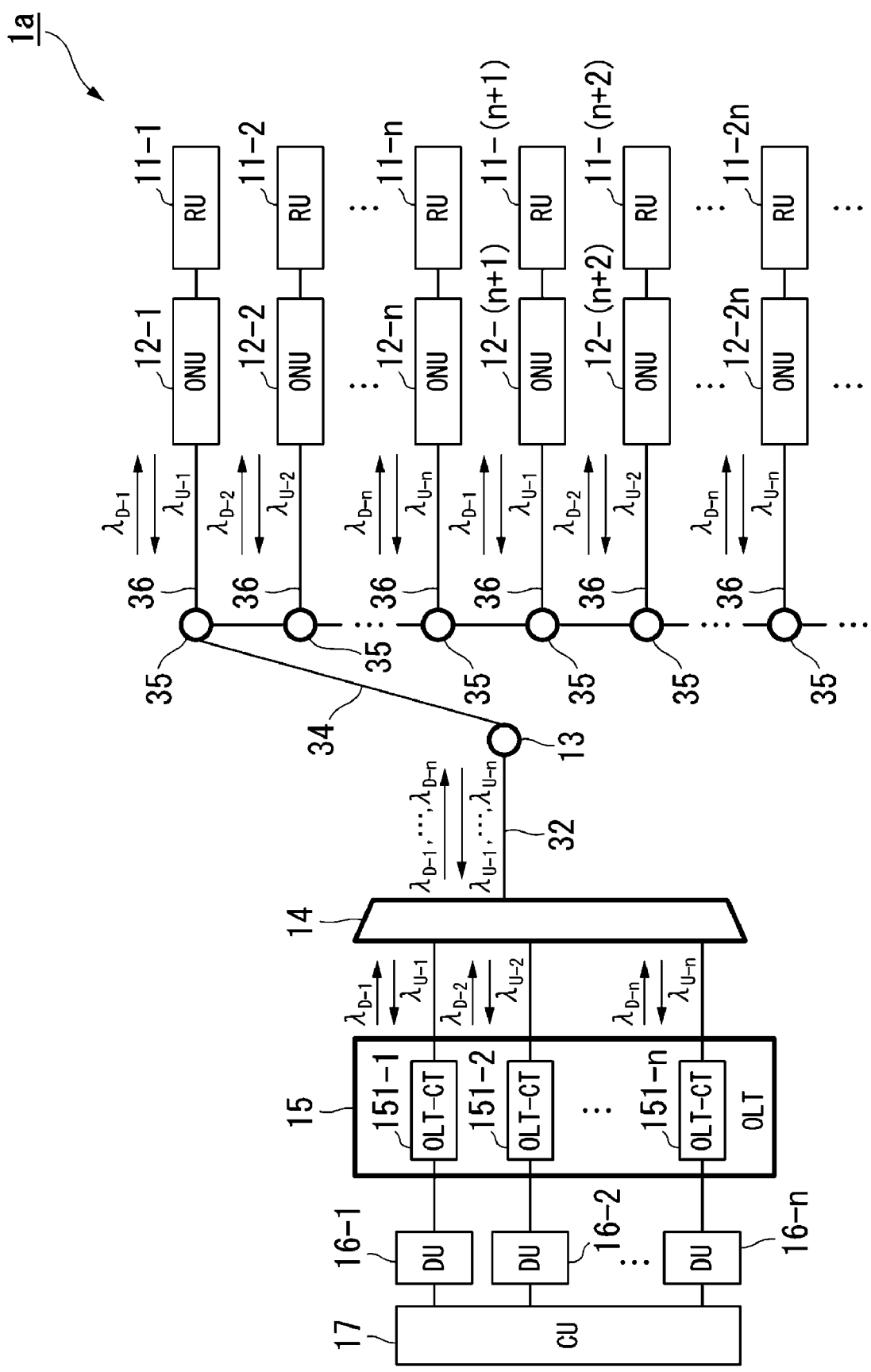
FIG. 3 is a diagram illustrating an exemplary configuration of the wavelength multiplexing communication system according to the first embodiment.

In the wavelength multiplexing communication system 1 illustrated in FIG. 1, a network configuration of an MFH section is star type, but may be a bus type as illustrated in FIG. 3. FIG. 3 is a diagram illustrating an exemplary configuration of a wavelength multiplexing communication system 1*a*. In FIG. 3, parts that are the same as those of the wavelength multiplexing communication system 1 illustrated in FIG. 1 are denoted by the same reference signs, and description thereof will be omitted. In the wavelength multiplexing communication system 1*a* illustrated in FIG. 3, the optical coupling/splitting unit 13 is connected to the transmission lines 32 and 34. The transmission line 34 is provided with a plurality of optical coupling/splitting unit 35. Each of the ONUs 12 and the optical coupling/splitting unit 35 are connected by a transmission line 36. The optical coupling/splitting unit 35 outputs the uplink signal received from the ONU 12 to the transmission line 34. The optical coupling/splitting unit 35 splits the downlink wavelength-multiplexed signal transmitted through the transmission line 34 and outputs the result to the transmission line 36. The optical coupling/splitting unit 13 outputs a wavelength-multiplexed signal obtained by multiplexing the uplink optical signals of wavelengths transmitted through the transmission line 34 to the transmission line 32. The optical coupling/splitting unit 13 outputs the downlink wavelength-multiplexed signal transmitted through the transmission line 32 to the transmission line 34.

Figure 4:
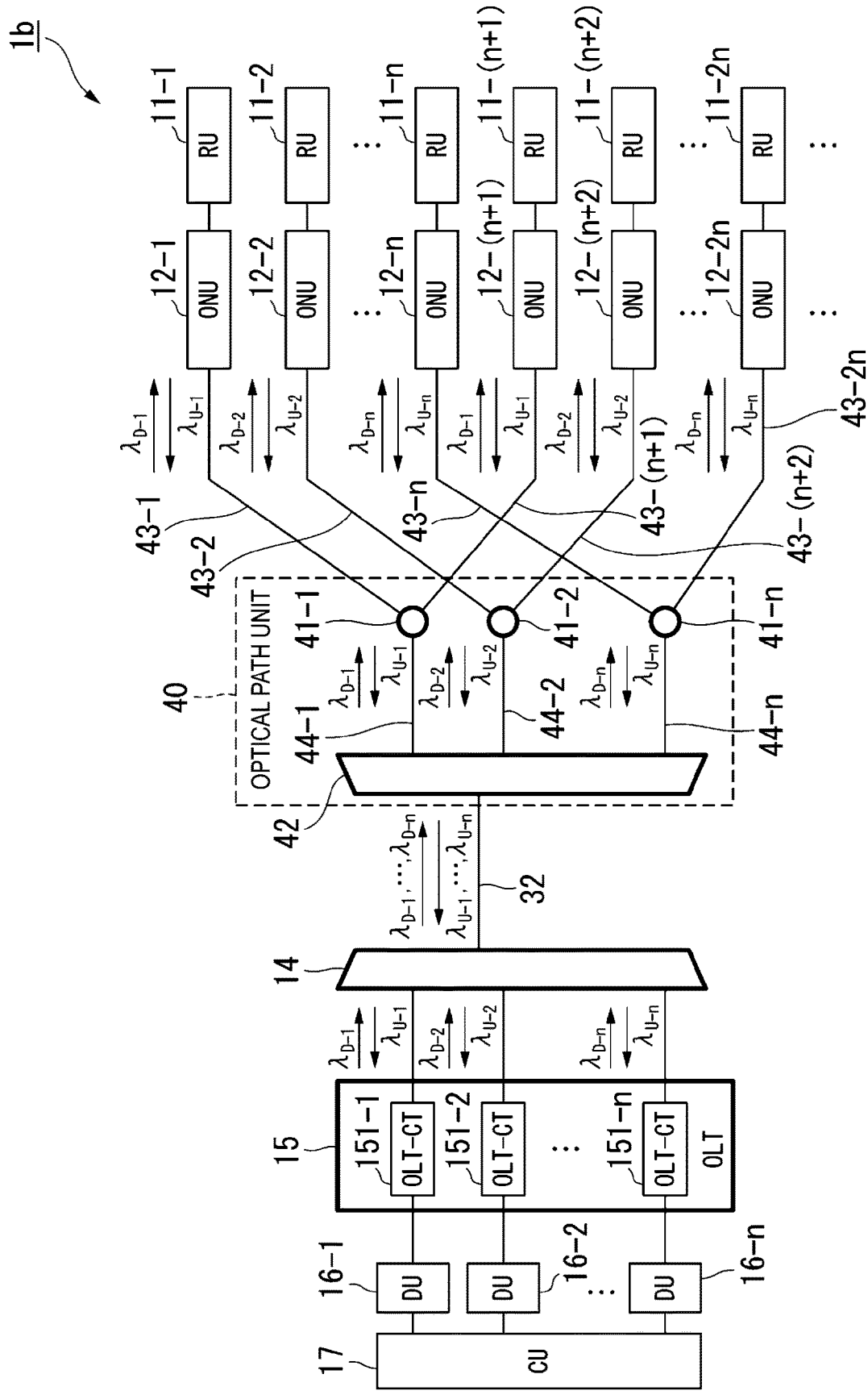
FIG. 4 is a diagram illustrating an exemplary configuration of the wavelength multiplexing communication system according to the first embodiment.

In the wavelength multiplexing communication system 1 illustrated in FIG. 1, a splitter is used as the optical multiplexing/demultiplexing unit 13, but a combination of the AWG and the splitter may be used as illustrated in FIG. 4. FIG. 4 is a diagram illustrating an exemplary configuration of a wavelength multiplexing communication system 1*b*. In FIG. 4, parts that are the same as those of the wavelength multiplexing communication system 1 illustrated in FIG. 1 are denoted by the same reference signs, and description thereof will be omitted. The wavelength multiplexing communication system 1*b* illustrated in FIG. 4 is different from the wavelength multiplexing communication system 1 illustrated in FIG. 1 is that, instead of the optical multiplexing/demultiplexing unit 13, an optical path unit 40 including an optical multiplexing/demultiplexing unit and a wavelength multiplexing/demultiplexing unit. The optical path unit 40 includes n power splitters 41 and an AWG42. The power splitter 41 corresponds to the optical multiplexing/demultiplexing unit and the AWG42 corresponds to the wavelength multiplexing/demultiplexing unit. n-power splitters 41 are described as power splitters 41-1 to 41-*n*. When j is not a multiple of n, the ONU 12-*j* is connected with the power splitter 41-(*j* mod(n)) by the transmission line 43-*j*, and when j is a multiple of n, the ONU 12-*j* is connected with the power splitter 41-*n* by the transmission line 43-*j*. The power splitter 41-*i* and the AWG 42 are connected by a transmission line 44-*i*.

On the condition that when j is not a multiple of n, k=(j mod(n)) is assumed, and when j is a multiple of n, k=n is assumed, the power splitter 41-*k* inputs the uplink optical signal of the wavelength $\lambda_{U-k}$ output by each subordinate ONU 12-*j* from the transmission line 43-*j*, and outputs the input uplink optical signal to a transmission line 44-*k*. The AWG 42 inputs the uplink signal of the wavelength $\lambda_{D-k}$ output by each power splitter 41-*k* from the transmission line 44-*k*. The AWG 42 performs wavelength multiplexing on the input uplink optical signal of the wavelength $\lambda_{U-1}$ to $\lambda_{U-n}$, and outputs the optical signal to the transmission line 32. The AWG 42 converts the downlink wavelength multiplexed signal input from the transmission line 32 into the downlink optical signal of the wavelength $\lambda_{D-1}$ to $\lambda_{D-n}$. The AWG 42 outputs the downlink optical signal of the wavelength $\lambda_{D-k}$ to the transmission line 44-*k*. The power splitter 41-*k* separates the downlink optical signal of the wavelength $\lambda_{D-k}$ input from the transmission line 44-*k*, and outputs the result to each transmission line 43-*j*.

The main signal is generated in only up to one of the plurality of RUs 11 connected with the same power splitter 41 via the ONU 12. For example, main signals are generated in any DU 11 among the DU 11-*n*, DU 11-2*n*, ... connected with the power splitter 41-1 respectively via the ONU 12-*n*, 12-2*n*, .... In other words, up to n ONUs 12 in which the main signal communication is performed are respectively connected with different power splitters 41. Thus, communication of a main signal of one RU 11 does not compress the band of the main signal communication of other RUs 11.

In the above, assuming a case where a moving body is one, and the maximum number n of RUs that perform radio communication at the same time is obtained according to the length of the moving body. When a plurality of moving bodies are present, a wavelength is shared between the moving bodies.

According to the present embodiment, when the number of RUs that perform radio communication at the same is n at the maximum, even if the number N of RUs is equal to or greater than n, the number of wavelengths used in the optical access section can be set to n from N in the related-art. The OLT-CT can be set to n from N in the related-art. Accordingly, it is possible to reduce costs of optical communication and improve utilization efficiency of a band.

Second Embodiment

In the present embodiment, the ONU that is the connection destination of the RU that is not performing radio communication with the UE is allowed to sleep.

Figure 5:
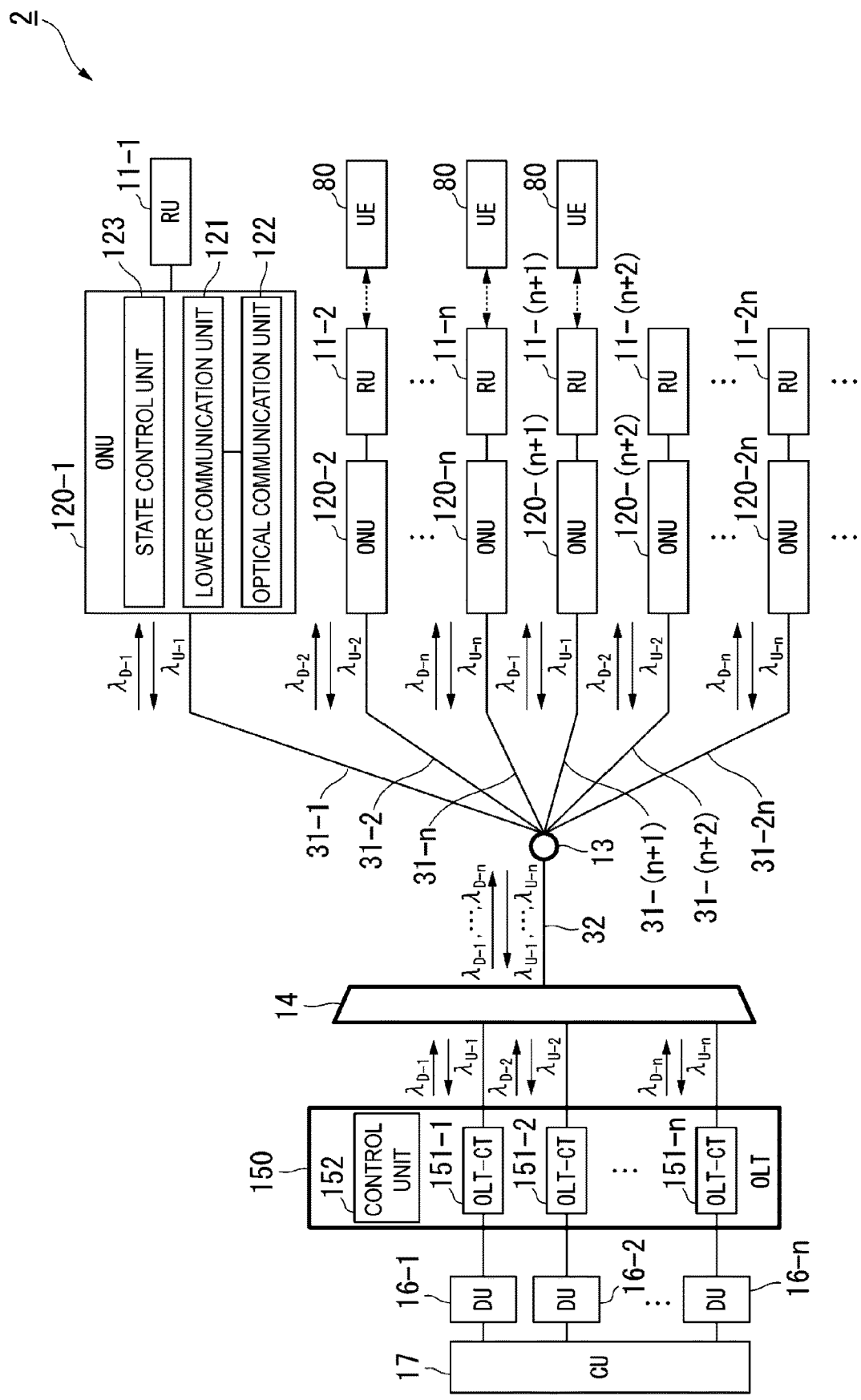
FIG. 5 is a diagram illustrating an exemplary configuration of a wavelength multiplexing communication system according to a second embodiment.
Figure 6:
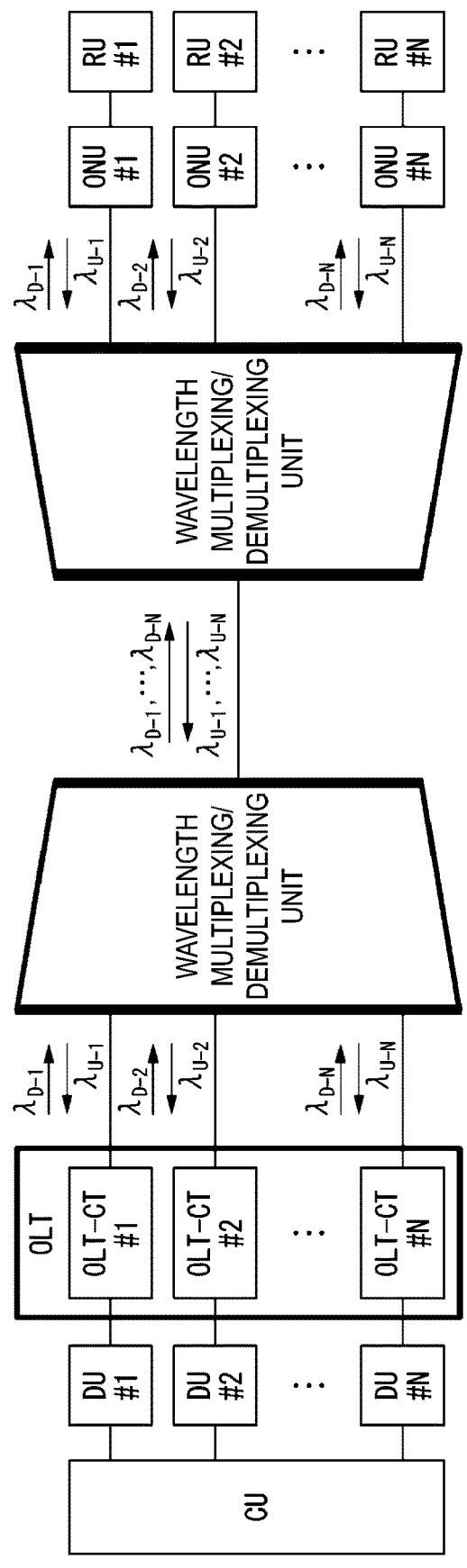
FIG. 6 is a diagram illustrating an exemplary configuration of a wavelength multiplexing communication system according to a related-art.
Figure 7:
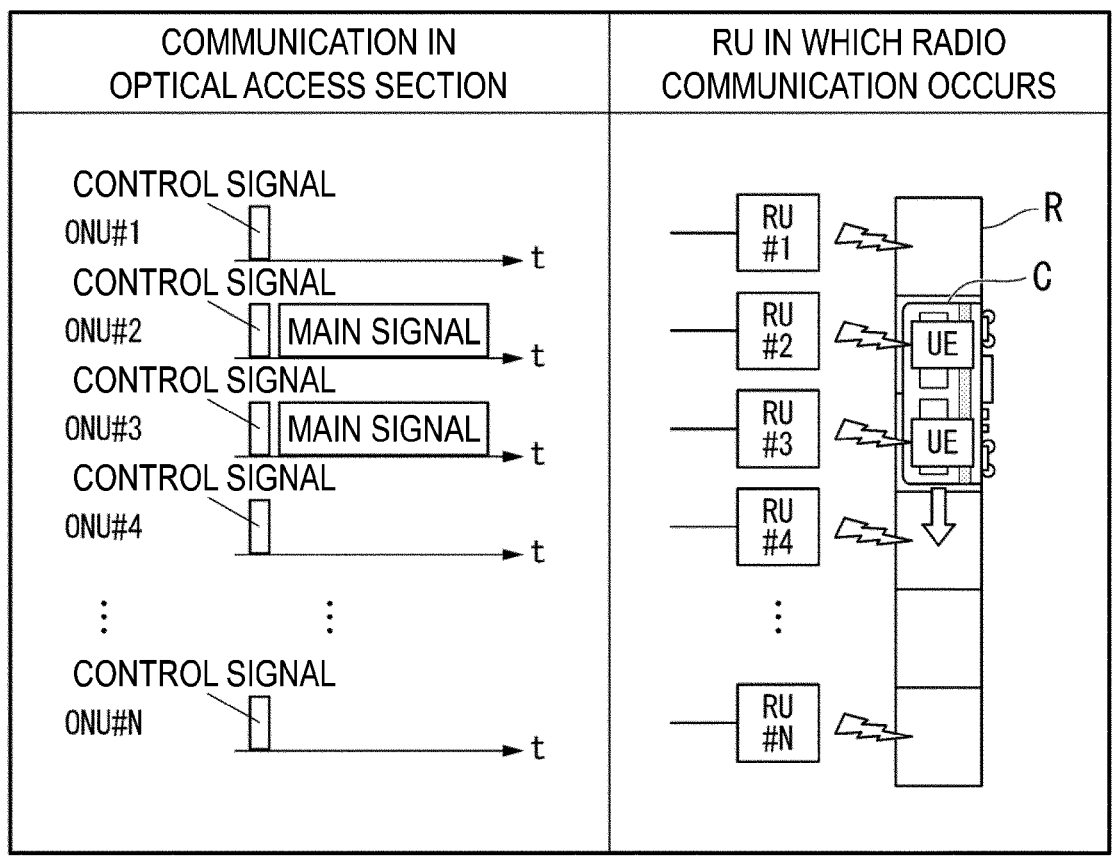
FIG. 7 is a diagram illustrating a use case of a moving body according to the related-art.

FIG. 5 is a diagram illustrating an exemplary configuration of a wavelength multiplexing communication system 2 according to a second embodiment. In FIG. 5, parts the same as those of the wavelength multiplexing communication system 1 illustrated in FIG. 1 are denoted by the same reference signs, and description thereof will be omitted. The wavelength multiplexing communication system 2 illustrated in FIG. 5 is different from the wavelength multiplexing communication system 1 illustrated in FIG. 1 in that the wavelength multiplexing communication system 2 includes an ONU 120 instead of the ONU 12 and an OLT 150 instead of the OLT 15. N ONUs 120 are described as the ONU 120-1 to the ONU 120-N.

The ONU 120 is different from the ONU 12 illustrated in FIG. 1 in that the ONU 120 further includes a state control unit 123. The state control 123 receives a control signal indicating sleep from the OLT 150, and turns the host ONU from the active state to the sleep state. The active state is the normal operating state. The sleep state is a state in which at least some functions of the ONU 120 is stopped. The state control unit 123 returns to the active state in a case where a predetermined trigger is detected, for example, in a case where a certain period of time elapses after the state enters the sleep state. The ONU 120 does not transmit an uplink signal to the OLT 150 or does not communicate with the OLT 150 in the sleep state.

The OLT 150 is different from the OLT 15 illustrated in FIG. 1 in that the OLT 150 further includes a control unit 152. The control unit 152 determines the ONU 120 as a sleep target on the basis of a traffic amount of communication with each ONU 120. The sleep target is an ONU 120 in which the main signal communication is not performed. That is, the ONU 120 as the sleep target is the connection destination of the RU 11 that is not performing radio communication with the UE 80. For example, the control unit 152 determines that ONU 120 is the sleep target when a traffic amount of communication with the ONU 120 is equal to or less than a threshold during a period between a current time and a time of a predetermined time back from the current time. The control unit 152 transmits a control signal instructing sleep to the ONU 120 determined to be the sleep target.

In the related art, N wavelengths have been used since it is necessary to assign a unique wavelength for each of N ONUs in the optical access section. According to the above-described embodiment, when the maximum number of RUs that perform the radio communication at the same time is n(n≤N), communication with the UE can be achieved using n wavelengths and n OLT-CTs at a speed equivalent to the case where a unique wavelength is assigned for each of the N ONUs.

As described above, the number of OLT-CTs and the number of wavelengths required for each RU to communicate with the UE can be reduced as compared with the related-art by a radio speed equivalent to that in a case where a unique wavelength is assigned to each ONU. Accordingly, system utilization efficiency is improved for band demand, and capital investment costs can be reduced.

According to the embodiments described above, the wavelength multiplexing communication system includes a master station apparatus and a plurality of slave station apparatuses. The master station apparatus is, for example, the OLT 15, or the OLT 150. The slave station apparatuses are, for example, the ONUs 12, 120. The master station apparatus includes a wavelength multiplexing communication unit. The wavelength multiplexing communication unit is, for example, the OLT-CTs 151-1 to 151-N. The wavelength multiplexing communication unit performs wavelength multiplexing communication with the plurality of slave station apparatuses by the number of wavelengths equal to or less than the number of the plurality of slave station apparatuses. The slave station apparatus includes an optical communication unit. When the main signal communication is performed in the host slave station apparatus, the optical communication unit communicates with the master station apparatus by an optical signal having the same wavelength as the wavelength used by another slave station apparatus in which a main signal notification is not performed.

When the main signal communication is performed in the host slave station apparatus, the optical communication unit communicates with the master station apparatus by an optical signal having the same wavelength as the wavelength used by another slave station apparatus in which the main signal notification is not performed and having a different wavelength used by another slave station apparatus in which the main signal notification is performed.

The combination of the slave station apparatuses in which main signal communication is performed changes with time. In any of the combinations that change with time, the wavelength may be assigned in advance to the plurality of slave station apparatuses such that the slave station apparatuses included in the combination each use different wavelengths.

The wavelength multiplexing communication system may further include a control unit configured to stop at least some functions of the slave station apparatus in which main signal communication is not performed.

Although embodiments of the present invention have been described above in detail with reference to the drawings, the specific configurations thereof are not limited to those of the embodiments and also include designs or the like without departing from the spirit of the present invention.

REFERENCE SIGNS LIST 1, 1a, 1b, 2 Wavelength multiplexing communication system
11-1 to 11-2n RU
12-1 to 12-2n, 120-1 to 120-2n ONU
13, 35 Optical coupling/splitting unit
14 Wavelength multiplexing/demultiplexing unit
15, 150 OLT
16-1 to 16-n DU
17 CU
31-1 to 31-2n, 32, 34, 36, 43-1 to 43-2n, 44-1 to 44-n Transmission line
40 Optical path unit
41-1 to 41-n Power splitter
42 AWG
121 Lower communication unit
122 Optical communication unit
123 State control unit
151-1 to 151-n OLT-CT
152 Control unit

The invention claimed is:

1. A wavelength multiplexing communication system comprising:
a master station apparatus; and
a plurality of slave station apparatuses,
wherein
the master station apparatus includes a wavelength multiplexing communication unit configured to perform wavelength multiplexing communication with the plurality of slave station apparatuses by using opticals signal having a plurality of wavelengths, the number of wavelengths being a plurality equal to or less than the number of the plurality of slave station apparatuses,
wherein the wavelength multiplexing communication unit includes an arrayed wave guide (AWG), and
a slave station apparatus of the plurality of slave station apparatuses includes an optical communication unit configured to, when main signal communication is performed in the slave station apparatus, communicate with the master station apparatus by using an optical signal having the same wavelength as a wavelength used by another slave station apparatus of the plurality of slave station apparatuses,
an optical path unit includes an AWG and a plurality of power splitters, wherein the number of the plurality of power splitters is the same as the number of wavelengths, each of the plurality of power splitters providing a plurality of outputs to a plurality of differnet ones of the slave station apparatuses, and each of the plurality of slave station apparatus connected to only one of the power splitters.

2. The wavelength multiplexing communication system according to claim 1,
wherein, when the main signal communication is performed in the slave station apparatus, the optical communication unit communicates with the master station apparatus by an optical signal having a same wavelength used by another slave station apparatus of the plurality of slave station apparatuses in which the main signal communication is not performed and having a different wavelength used by another slave station apparatus of the plurality of slave station apparatuses in which the main signal communication is performed.

3. The wavelength multiplexing communication system according to claim 1,
wherein a combination of the slave station apparatuses in which the main signal communication is performed changes with time.

4. The wavelength multiplexing communication system according to claim 3,
wherein, in any of the combination, a wavelength is assigned in advance to the plurality of slave station apparatuses such that the slave station apparatuses included in the combination each use different wavelengths.

5. The wavelength multiplexing communication system according to claim 1,
further comprising a control unit configured to stop at least some functions of the slave station apparatus.

6. A wavelength multiplexing communication method in a wavelength multiplexing communication system including a master station apparatus and a plurality of slave station apparatuses,
the method comprising:
performing, by the master station apparatus, wavelength multiplexing communication with the plurality of slave station apparatuses by using optical signals having a plurality of wavelengths, the number of wavelengths being a plurality equal to or less than the number of the plurality of slave station apparatuses,
the master station apparatus including an arrayed wave guide (AWG);
performing, by a slave station apparatus of the plurality of slave station apparatuses, when main signal communication is performed in the slave station apparatus, communication with the master station apparatus by using an optical signal having the same wavelength as a wavelength used by another slave station apparatus of the plurality of slave station apparatuses; and
by an optical path unit including an AWG and a plurality of power splitters, wherein the number of the plurality of power splitters is the same as the number of wavelengths, each of the plurality of power splitters providing a plurality of outputs to a plurality of differnet ones of the slave station apparatuses, and each of the plurality of slave station apparatus connected to only one of the power splitters.

\* \* \* \* \*